Figure 1:
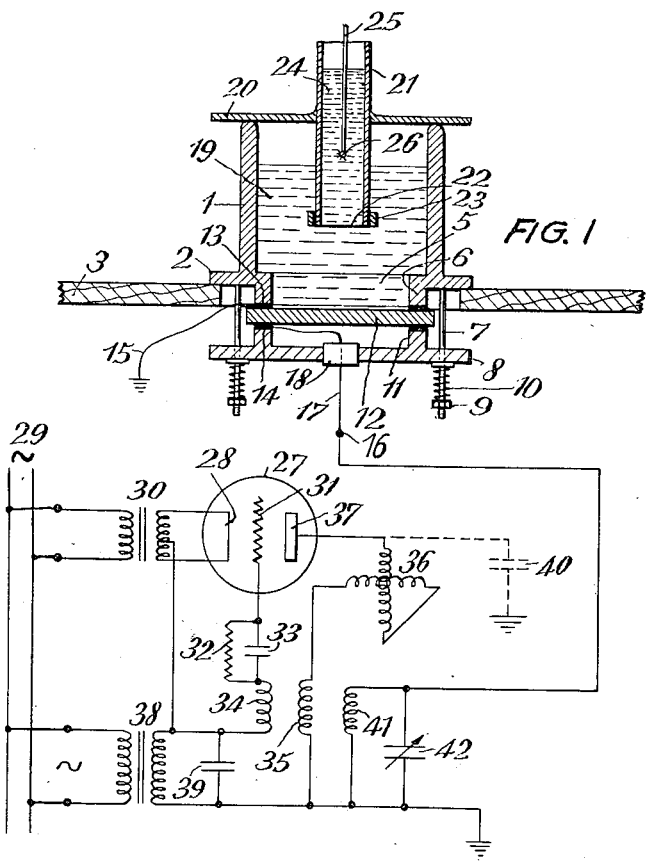

Aug. 28, 1956    P. GANDER    2,760,501
APPARATUS FOR CLEANING PARTS OF HOROLOGICAL INSTRUMENTS
Filed Sept. 28, 1953

INVENTOR.
Philippe Gander
BY
Truman A. Henson

2,760,501
// Patented Aug. 28, 1956

UNITED STATES PATENT OFFICE 2,760,501

APPARATUS FOR CLEANING PARTS OF HOROLOGICAL INSTRUMENTS

Philippe Gander, Bienne, Switzerland, assignor to The Gruen Watch Co., Cincinnati, Ohio, a corporation of Ohio Application September 28, 1953, Serial No. 382,827

8 Claims. (Cl. 134—58)

The present invention relates to the cleaning of parts of horological instruments, and more particularly to the cleaning of parts or components used in the production of watches.

The present application is a continuation-in-part of my application Serial No. 292,081, filed May 21, 1952, now abandoned, as a division of my copending application Serial No. 212,105, filed February 21, 1951, now abandoned, which latter application concerns a method whereby such components can be cleaned of foreign matter of every kind, organic and inorganic, such as grease, films, resinous deposits, gums, chippings, shavings, dust and the like. Such foreign matter may be lodged in cavities which, on account of their small size or their location, are inaccessible to solvents or ordinary mechanical means as commonly used for cleaning, and if left on the said components, would interfere unfavorably with the regular working of the finished watch.

The object of the present invention is to provide an apparatus for carrying out such method.

The invention makes use of ultra-sonic vibrations and takes advantage of their ability, on one hand, to disrupt certain molecular links of an electrical character such as surface cohesion, and, on the other hand, to impart oscillations to very small particles, whereby the latter are subjected to accelerations which may attain several thousand times the terrestrial gravity acceleration. This combined ability of ultra-sonic vibrations is used to tear undesirable foreign particles from the surfaces to which they stick, and to move them away from the said surfaces even though the size of these particles is only of the molecular order.

Further objects and particulars of the invention now will become apparent from the description, by way of example of an embodiment thereof and the way in which it is to be operated, with reference to the accompanying drawing.

In the drawing:

Figure 1 is a sectional view taken substantially centrally and vertically through an apparatus constructed in accordance with the principles of the present invention and showing the same operatively applied to a frequency generator, the latter being shown in the form of a circuit diagram; and Figures 2 to 5 inclusive are oscilloscope patterns representing various forms of high frequency vibrations employed in connection with the invention.

Referring now to the apparatus according to Fig. 1, it will be seen that it comprises a pot 1 having an outer flange 2 by means of which it rests upon a support 3, which for instance may form the upper wall of a casing enclosing the electric vibration generating arrangement described later on. The base of the pot 1 is provided with a circular aperture 5 surrounded by a downwardly extending flange 6. The pot 1 carries a series of bolts 7, which extend downwardly and pass through holes provided in a supporting plate 8. To the lower extremity of the bolts 7, there are applied nuts 9, between which nuts and the supporting plate 8 coil springs 10 are disposed, tending to press the plate 8 in upward direction. Said plate has an upwardly extending flange 11 situated opposite the flange 6 of the pot 1. Between the flanges 6 and 11 there is arranged a plate of piezoelectric quartz 12, the two faces of which are metallized. Two lead rings are interposed, one of them at 13 between the quartz plate 12 and the flange 6 and the other 14 between this plate and the flange 11. These two rings serve as electrical connecting media for the metal coatings the quartz plate is provided with, the upper ring 13 moreover providing a tight joint between the quartz plate and the flange 6 of the pot 1. The ring 13, being in contact with the upper metal layer of the quartz plate 12, is grounded, as diagrammatically indicated at 15, while the ring 14, being in contact with the lower metal layer of this plate, is connected to an insulated terminal 16 by means of a conductor 17, passing through an insulating socket 18 mounted in the supporting plate 8.

The pot 1 is filled with oil 19. It is closed by a cover 20 in which a vertical tube 21 is mounted forming the body of an upwardly open receptacle, which at its bottom end is closed by means of a diaphragm 22. The marginal portions of this diaphragm, which preferably is made from silver, are drawn upwardly towards the circumference of the tube and pressed against the latter by a steel ring 23.

Since the apparatus is destined for cleaning parts the greatest dimension of which is of the order of 5 mm., the receptacle 21 has for example a diameter of 60 mm. and a height of 250 mm. The thickness of the diaphragm 22 is for instance 0.05 mm. The receptacle formed by the tube 21 and the diaphragm 22 is filled with a liquid detergent 24, for example alcohol or any other organic solvent in which the pieces 26 to be cleaned are suspended by means of a steel wire 25.

The means for causing ultrasonic vibration of the quartz plate 12, and consequently of the pot 1, comprises a triode tube 27, the filament 28 of which is heated by an alternating current of 50 cycles per second, supplied from an electric power distribution line 29 by means of a transformer 30. The grid 31 of the tube is connected by a polarisation resistance 32 connected in parallel with a condenser 33 to a grid coil 34 coupled with an anode coil 35, which in series with a variometer 36 is connected to the anode 37 of the tube 27. Moreover, the circuit of the grid 31 includes the secondary coil of a second transformer 38 supplied with frequency of the pulsation which it is desired to superimpose upon the oscillations of ultrasonic frequency. The primary of the transformer 38 is likewise supplied by the network 29, so that the pulsation will have a frequency of 50 cycles per second. The secondary of the transformer 38 is connected in parallel with a condenser 39. The frequency of the oscillation of ultrasonic frequency itself is determined by the characteristics of the elements 34, 35, 36 and by the residual capacities of the coils as well as by the leakage capacities of the electrodes of the tube 27 and of the connections, which capacities are symbolized by a condenser 40 indicated in dash lines. These elements are selected and adjusted so that the frequency of the oscillation will be between 100 and 2000 kilocycles per second. Finally, a coil 41 coupled with the grid coil 34 and the anode coil 35 collects the electric energy of high ultra-sonic frequency in order to feed it to the terminal 16 with which the transducer 12 is connected. The reactance of the latter is compensated by means of an adjustable condenser 42.

Figures 2, 3:
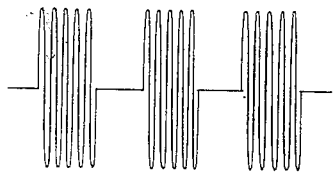

The form of the oscillations of ultrasonic frequency obtained by this generator is indicated in Fig. 2. As may be seen, the polarity of the anode 37 changes every half cycle of the pulsation owing to the transformer 38 so that the oscillation of ultrasonic frequency takes place only during half a cycle of each pulsation-cycle and with an amplitude first increasing and then decreasing.

It is possible to obtain a steady oscillation of ultrasonic frequency like that indicated in Fig. 3 by replacing the secondary of the transformer 38 and the condenser 39 with a source of direct current (not shown) connected into the anode circuit.

Figures 4, 5:
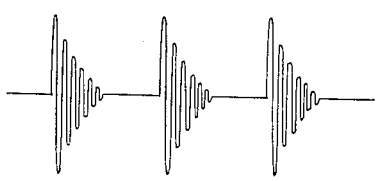

Other alternative arrangements which will readily occur to anybody skilled in electronics would permit to obtain an oscillation of constant amplitude according to Fig. 4 or a damped oscillation according to Fig. 5.

Due to the electric high frequency oscillations transmitted to the quartz plate 12 serving as transducer, this plate effects corresponding mechanical oscillations and impresses them upon the oil contained in the pot 1. This oil in turn transmits these oscillations across the diaphragm 22 to the liquid detergent 24, the oscillations of which cause the adhering impurities to be detached from the piece 26 to be cleaned.

In this embodiment, when it is necessary to replace the detergent 24 and clean the tubular receptacle 21 and the diaphragm 22 from impurities deposited thereon, the cover 20 which comprises these parts can readily be removed for this purpose without disturbing the tight joint at 13 and the electric connections to the transducer plate 12. Also, the latter is not in contact with the detergent 24 and is therefore not exposed to its attack if a somewhat aggressive liquid is used. A further advantage of this arrangement of the receptacle 21 which, as will be seen later, preferably has definite comparatively small dimensions, is that a special cooling system for the detergent can be dispensed with, because the pot 1 and the body of oil 19 which it contains can be made large enough to ensure adequate dissipation of the heat generated by vibration both in the said body of oil and in the detergent 24.

In order to assure a good transmission of the ultrasonic oscillations of the oil 19 to the liquid detergent 24, the thickness of the diaphragm 22 is preferably small in comparison with the wave length of the oscillations (velocity of propagation of the sound divided by the frequency of the oscillation) in the metal of the diaphragm, for example less than one-tenth of this wavelength. The velocity of propagation of sound in silver being of the order of 3000 m./sec., this wavelength will be of the order of 30 to 1.5 mm. respectively for frequencies ranging from 100 to 2000 kilocycles per second. A diaphragm 22 of 0.05 mm. thickness thus perfectly fulfills this condition for the considered gamut of ultrasonic frequencies.

A modification of the embodiment, which may be employed when one is in a position to determine or to control the frequency of the ultrasonic oscillation with sufficient accuracy, consists in that the diaphragm 22 is replaced by a plate, for example from stainless steel, attached in fluid-tight manner to the tube 21 or formed as an integral part of the latter, and that this plate is given a thickness equal to $n\lambda/2$, $n$ being an integer and $\lambda$ being the wavelength of the ultrasonic oscillation, so that the amplitude of oscillation at the top surface of the plate is approximately equal to that prevailing at the bottom surface. The velocity of sound propagation in the steel being of the order of 5000 m./sec., it would also be possible, for instance with an ultrasonic oscillation of a frequency of 500 kilocycles per second for which the wavelength is 10 mm., to give said plate a thickness of exactly 5, 10 or 15 mm., which would result in a sturdy construction of the base. On the other hand, if the base plate in this example were formed with a thickness of $n\lambda/2+\lambda/4$, i. e. of 2.5, 7.5 or 12.5 mm., one readily realizes that this plate would totally reflect the waves of ultrasonic oscillation, imparted to the oil 19 and that the oscillation would not be transmitted to the liquid detergent 24.

Owing to the reflection of the ultrasonic waves on the piece or the pieces to be cleaned, on the lateral walls of the receptacle, and on the surface of the liquid contained therein, the cleaning efficiency, on the other hand, depends also on the dimensions and the proportions of the tubular receptacle 21 and on the ratio between these dimensions and the maximum dimension of the pieces to be cleaned. It has been found that the above indicated dimensions are particularly convenient for pieces the largest dimension of which is 5 mm., but in general satisfactory results are obtained with receptacles, the height of which is equal to at least one time and at most ten times the greatest width. For cleaning pieces of determined dimensions, preferably a receptacle is selected, the height of which is between ten and fifty times, and the greatest width of which is between three and ten times the largest dimension of the greatest of all pieces to be simultaneously cleaned. These dimensions of the receptacle permit a good proportion of the waves of ultrasonic oscillations to strike against all sides of the pieces to be cleaned, either directly or after a minimum of reflection.

While quite satisfactory cleaning results have been obtained by submitting the liquid detergent 24 to continuous constant-amplitude vibrations of ultra-sonic frequency of the type shown in Fig. 4, experience has shown recurrent or pulsating series of oscillations of the type shown in Figs. 3, 5 and 6 to yield still better cleaning results. The generator arrangement shown in Fig. 2, which produces vibrations of the type shown in Fig. 3 also has the advantage that no other source of current is required than that available in a conventional alternative current network.

I claim:

1. Apparatus for cleaning parts of horological instruments of foreign matter deposited upon them, said apparatus comprising a generator of electric high frequency vibrations in the frequency range of from 100 to 2000 kilocycles per second, a transducer electrically connected to said generator for converting said electric vibrations into mechanical vibrations of the same frequency, a container for a liquid body, said container having a bottom wall in contact with said liquid body and formed by a metallic diaphragm having a thickness smaller than the velocity of propagation of sound in the metallic material of the diaphragm divided by ten times the frequency of the vibrations emitted by said generator, means connecting said transducer to said diaphragm to transmit said vibrations thereto for retransmission to said liquid body, and means for supporting said parts in said container.

2. Apparatus as claimed in claim 1 in which said diaphragm is made from silver and in which said diaphragm thickness is less than approximately 0.05 mm.

3. Apparatus as claimed in claim 1 in which said container comprises a vertical tubular wall member and a clamping ring encircling said wall member at its lower end, said diaphragm having upwardly extending marginal portions clamped between said clamping ring and wall member.

4. Apparatus for cleaning parts of horological instruments of foreign matter deposited upon them, said apparatus comprising a generator of recurring series of electric high frequency vibrations in the frequency range of ultra-sonic vibrations, a transducer electrically connected to said generator for converting said electric vibrations into mechanical vibrations, a container for a liquid body, said container having a bottom wall in contact with said liquid body, means connecting said transducer to said bottom wall to transmit said vibrations thereto for retransmission to said liquid body, and means for supporting said parts in said container.

5. Apparatus for cleaning parts of horological instruments from foreign matter deposited upon them, said apparatus comprising a generator of recurring series of electric high frequency vibrations arranged to operate at a recurrence frequency of the said series of vibrations of between 30 and 3000 cycles per second, a transducer electrically connected to said generator for converting said electric vibrations into mechanical vibrations, a container for a liquid body, said container having a bottom wall in contact with said liquid body, means connecting said transducer to said bottom wall to transmit said vibrations thereto for retransmission to said liquid body, to effect the cleaning of said parts, and means for supporting said parts in said container.

6. Apparatus for cleaning parts of horological instruments from foreign matter deposited upon them, said apparatus comprising a generator of recurring series of electric high frequency vibrations arranged for producing damped oscillations within each of the said series of vibrations, a transducer electrically connected to said generator for converting said electric vibrations into mechanical vibrations, a container for a liquid body, said container having a bottom wall in contact with said liquid body, means connecting said transducer to said bottom wall to transmit said vibrations thereto for retransmission to said liquid body to effect the cleaning of said parts, and means for supporting said parts in said container.

7. Apparatus for cleaning parts of horological instruments from foreign matter deposited upon them, said apparatus comprising a generator of recurring series of electric high frequency vibrations arranged for producing oscillations of first increasing and thereafter decreasing amplitude in each of the said series of vibrations, a transducer electrically connected to said generator for converting said electric vibrations into mechanical vibrations, a container for a liquid body, said container having a bottom wall in contact with said liquid body, means connecting said transducer to said bottom wall to transmit said vibrations thereto for retransmission to said liquid body to effect the cleaning of said parts, and means for supporting said parts in said container.

8. Apparatus as claimed in claim 7 wherein said transducer is comprised of a quartz plate interposed between two metal plates and wherein said connecting means consists of an unbroken column of liquid interposed between one of said plates and the bottom wall of the container.

References Cited in the file of this patent

UNITED STATES PATENTS

| | | |
|---|---|---|
| 2,257,997 | Barnes | Oct. 7, 1941 |
| 2,468,550 | Fruth | Apr. 26, 1949 |
| 2,616,820 | Bourgeaux | Nov. 4, 1952 |

FOREIGN PATENTS

| | | |
|---|---|---|
| 548,960 | Great Britain | Oct. 30, 1942 |
| 260,870 | Switzerland | July 16, 1949 |